United States Patent [19]

Siegesleuthner et al.

[11] Patent Number: 5,023,638
[45] Date of Patent: Jun. 11, 1991

[54] PHOTOGRAPHIC PORTRAIT SHOOTING APPARATUS

[75] Inventors: Franz Siegesleuthner; Walter Hebeisen, both of Osterreich, Austria

[73] Assignee: Fotoking Passbildsysteme, Austria

[21] Appl. No.: 445,831

[22] PCT Filed: Feb. 15, 1989

[86] PCT No.: PCT/EP89/00139
§ 371 Date: Nov. 15, 1989
§ 102(e) Date: Nov. 15, 1989

[87] PCT Pub. No.: WO89/08865
PCT Pub. Date: Sep. 21, 1989

[30] Foreign Application Priority Data

Mar. 18, 1988 [DE] Fed. Rep. of Germany ....... 3809168

[51] Int. Cl.$^5$ ................ G03B 15/02; G03B 15/06; G03B 13/08
[52] U.S. Cl. .................... 354/126; 354/220; 354/290
[58] Field of Search ................ 354/290, 220

[56] References Cited

U.S. PATENT DOCUMENTS

| 1,799,767 | 4/1931 | Simijian | 354/220 |
| 2,051,608 | 8/1936 | Kean | 354/220 |
| 2,765,705 | 10/1956 | Simijian | 354/220 |

Primary Examiner—L. T. Hix
Assistant Examiner—Jae N. Noh
Attorney, Agent, or Firm—Andrus, Sceales, Starke & Sawall

[57] ABSTRACT

A photographic portrait shooting apparatus (30) comprising a camera (1) and a partially transmitting mirror (2) disposed in the optical path (9) between camera lens (3) and the object, wherein an even number, especially two reflecting mirrors (5, 6) are also disposed intermediate the object and the camera (1) or the camera lens (3), respectively. Only one of the reflecting mirrors, in particular the reflecting mirror (6) which directly faces the object or is closest thereto, is designed as a swinging mirror. The partially transmitting mirror (2) has a field of view limited by markings (12). Also, there is provided a camera remote release means (11, 14) operated by the person having his portrait taken.

20 Claims, 4 Drawing Sheets

5,023,638

PHOTOGRAPHIC PORTRAIT SHOOTING APPARATUS

BACKGROUND OF THE PRESENT INVENTION

The invention is directed to a photographic portrait shooting apparatus comprising a camera and a partially transmitting mirror disposed in the optical path between the camera lens and the object.

Such a shooting apparatus is known from both GB-A-628,219 and GB-A-532,455. But these shooting devices are not adapted to self-operation; rather, the camera has to be focused on the object by an operator prior to each shot being taken. Furthermore, the person having his portrait taken can see himself only in mirror-inverted fashion in the mirror associated with the camera. Since there is no remote shutter release for operation by said person, he is also unable to observe his own looks at the time of shutter release.

FR-A-1,007,112 describes a photographic portrait shooting apparatus comprising a camera and a mirror disposed intermediate the camera lens and the object, the mirror having a hole formed in the vicinity of the camera lens. Thus the mirror in which the person having his portrait taken can see himself before and during the shot is interrupted by the hole associated with the camera lens. A person wishing to have his portrait taken feels this to be a great nuisance. Further, there are no reflecting mirrors so that the picture taken is mirror-inverted. The same applies to the portrait shooting apparatus according to GB-A-17,092.

Additionally, however, the portrait shooting apparatus of FR-A-1,007,112 is also provided with a remote shutter release to be operated by the person having his portrait taken, so that he can himself determine the moment when the portrait is taken.

The portrait shooting devices of the prior art therefore produce only a mirror-inverted picture, because the camera lens has only one mirror disposed upstream thereof which faces the object or the person whose portrait is to be taken, respectively. Also, in the prior art either the camera must be manipulated or the object or person must be displaced correspondingly, so that the desired picture can be obtained within predetermined picture boundaries. In order to avoid the need for a separate operator, as proposed in GB-A-532,455, a revolving stool which is height-adjustable upwardly and downwardly by corresponding rotation is normally offered the person having his portrait taken. With this structure, which has hitherto been used exclusively in practice, the person having his portrait taken must often get up more than once in order to adjust the stool height until his eyes, for instance, are at the level of a predetermined marking line. In order to avoid such troublesome getting-up and sitting-down, it is often attempted to achieve the required eye level by stretching or stooping, the consequence being a loss of relaxed features. Users of conventional photo-booths are then annoyed because of the facial expression retained on the picture. Frequently, this expression is distorted because the person having his portrait taken cannot observe his own features at the time of shutter release. This is due to the fact that in the conventional photo-booths the camera is released with a time delay relative to the depression of a corresponding actuating button or the like.

Finally, it is also extremely difficult with the known portrait shooting devices to centre the object, for instance the user's head, within the desired picture, i.e. to orientate it not only in respect of height but also laterally.

To solve the above-specified problems it has been proposed in PCT/EP87/00530 that between the object and the partially transmitting mirror disposed upstream of the camera lens there is disposed an even number of reflecting mirrors which are designed as swinging mirrors. Furthermore, the partially transmitting mirror has a field of view which is limited by markings. Finally, there is also provided a remote camera release means for operation by the person having his portrait taken.

Due to the fact that the partially transmitting mirror which is associated with the camera has a field of view that is limited by markings, and due to the fact that the reflecting mirrors are swinging mirrors, the user of the proposed portrait shooting apparatus is able to obtain a centered picture without any manipulation of camera or seat. It is merely required to swing a reflecting mirror appropriately. At the same time, the provision of an even number of reflecting mirrors between the person and the partially transmitting mirror associated with the camera offers the advantage that the optical path is correspondingly folded and consequently the distance between the camera and the person having his portrait taken is correspondingly reduced, so that the required object distance is ensured even within a very confined space. The even number of reflecting mirrors also results in a non-reversed mirror image to which the user is accustomed. Finally, the remote camera release operable by the person having his portrait taken guarantees that the person can observe his features at the time of exposure. Thus, the camera is released when the person having his portrait taken has centered his mirror image as desired within the markings of the field of view. The picture corresponds exactly to the mirror image within the marked field of view.

It is the object of the present invention additionally to improve the portrait shooting apparatus proposed in PCT/EP87/00530 in respect of the design and handling thereof.

SUMMARY OF THE PRESENT INVENTION

In accordance with the invention the specified object is solved By the improvement of the present invention only one of an even number of reflecting mirrors is designed as a swinging mirror so as to achieve the above-mentioned advantages. It is preferred that the reflecting mirror closest to the object or the person having his portrait taken should be designed as a swinging mirror. However, it is likewise possible to design the reflecting mirror closest to the camera as a swinging mirror In the final analysis, this depends on the space available for the swinging mirror mechanism within the portrait shooting apparatus.

In respect of design it is advantageous to dispose the partially transmitting mirror in the optical path between the two reflecting mirrors. Thereby, the view into the camera lens space of the portrait shooting apparatus is well covered from outside, too.

Basically, it will suffice when the reflecting mirror which is closest to the object or the person having his portrait taken can be pivoted about a horizontal axis. As explained above, it is possible with this configuration to avoid having to adjust the stool level for the person having his portrait taken For lateral adjustment of the object within the markings of the field of view it may also be advantageous when the reflecting mirror which is closest to the object is also mounted for rotation about a vertical axis, in particular mounted for universal movement.

Basically, it is also possible to mount one reflecting mirror for movement about a horizontal axis and the other one for movement about a vertical axis. This permits both height and lateral adjustment of the object within the markings of the field of view; however, as regards operation and design this solution is less advantageous.

A particularly simple design for the swinging mirror mechanism is characterized by the feature that the swingably mounted reflecting mirror is connected via a lever mechanism to an actuating element, especially a rotatably mounted actuating button, which is disposed within the operating area of the object, i.e. the person taking his own portrait. Preferably, the lever mechanism is a simple crank mechanism.

In order to further facilitate operation of the apparatus, the actuating element cooperating with the swingably mounted reflecting mirror is preferably combined with the remote camera release means to constitute a unitary assembly, especially in the form of a rotatably mounted handle with release button which is mechanically operatively connected with the camera release mechanism (release wire). Provided a reflecting mirror mounted for universal movement is concerned, the associated actuating element with or without remote camera release means is preferably also mounted for universal movement, i.e. in joystick fashion.

Normally, cameras are used with a manually operated or motor-driven camera cocking means which is then advantageously coupled to an electronic or mechanical counter and/or a coin or chip mechanism such that the camera cocking mechanism is released only after insertion of a coin or a chip. Of course, the counter may also be coupled to the camera release means.

To improve maximum light transmission and hence the quality of the pictures, each of the reflecting mirrors preferably has a silvered surface.

Furthermore, to this end the camera or film magazine has means associated therewith to control the temperatures thereof These measures are intended to ensure that the film always is at a preferred constant temperature. It has been found that the picture quality varies greatly with the film temperature, above all when so-called self-developing films are used.

Lighting technique, disclosed herein, are of special significance independently of the above-described measures. The lighting features ensure particularly good and uniform illumination of the exposure space and therefore of the object while there is no excessive dazzling of the object or the person whose portrait is being taken.

Finally, background features structure and are disclosed which also ensure good illumination and easy replacement of the background associated with the object to be photographed.

When the photographic shooting apparatus comprises a booth movable on rollers or the like, the seat and especially a stool can preferably be fixed to the booth, and in particular one leg of the stool is passed through a lug or the like provided on the inside of the booth so that a predetermined spatial relationship of the seat or stool and the reflecting mirror closest to the user is guaranteed. At the same time this ensures that the booth can no longer be moved along the ground when a person occupies the stool. It is retained by the stool with the user seated thereon. When the booth is to be moved or cleaned, the stool need only be lifted from the retaining lug and removed. In this respect an operationally simple construction is concerned.

BRIEF DESCRIPTION OF DRAWINGS

Below, an embodiment of the photographic shooting apparatus in accordance with the invention will be described in detail with reference to the accompanying drawing, in which.

DESCRIPTION OF THE ILLUSTRATED EMBODIMENT

Figure 3:
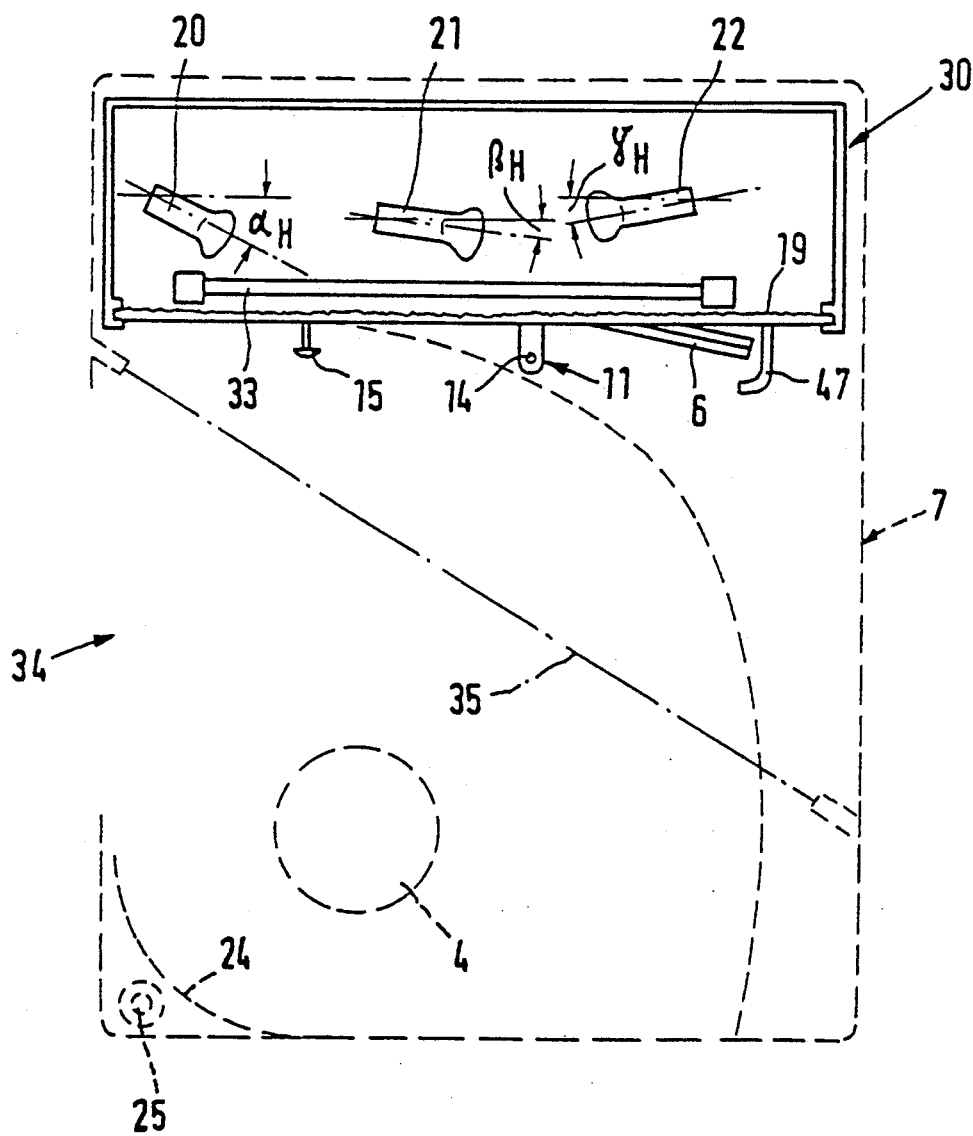
FIG. 3 is a plan view of the shooting apparatus of the invention within a booth (illustrated in dashed lines) defining the shooting space, wherein the top cover is removed to show the lighting equipment.
Figure 4:
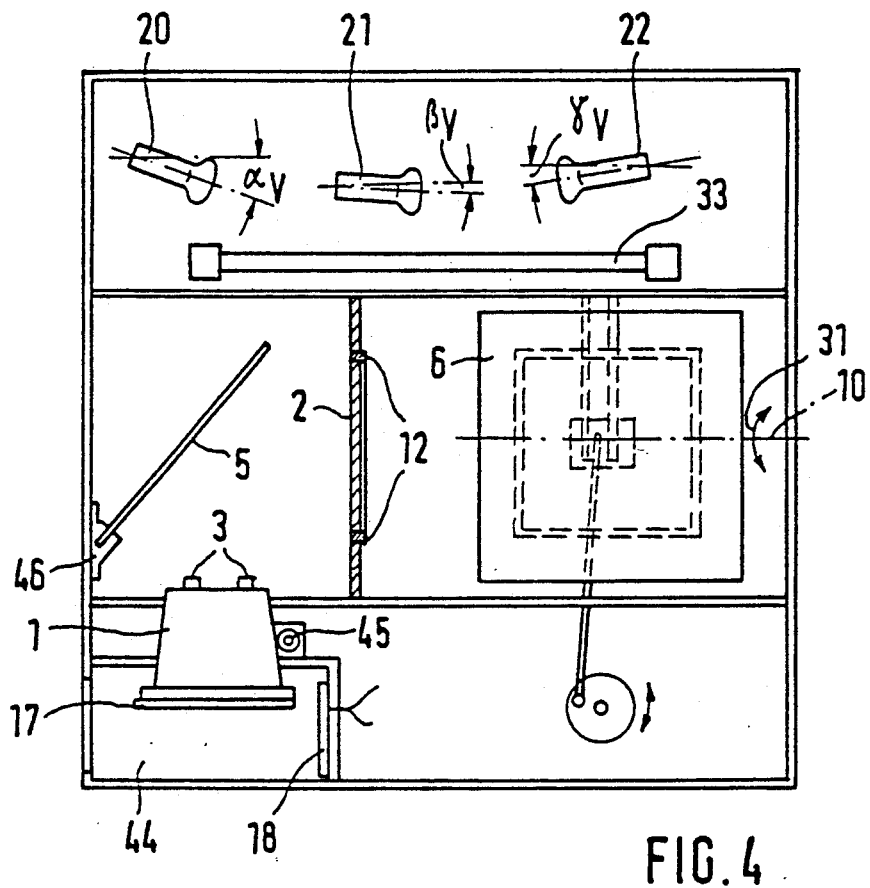
FIG. 4 is a front view of the shooting apparatus of FIG. 3, wherein the front cover is removed to show the lighting equipment as well as the mirror and camera means.

As will be apparent from FIGS. 1 to 4, the illustrated embodiment of a photographic shooting apparatus comprises a camera 1, two reflecting mirrors 5, 6 and a partially transmitting mirror 2 disposed in the optical path intermediate said two reflecting mirrors; the partially transmitting mirror 2 extends normal to the optical path intermediate the two reflecting mirrors 5 and 6. Furthermore, the partially transmitting mirror 2 is disposed so as to face the object relative to the optical path through the lens 3 (four-element lens) of the camera. By means of the partially transmitting mirror 2 the person having his portrait taken, who is within a space defined by the booth 7 and especially sits on a stool 4, is provided with a continuous mirror image. By means of the two reflecting mirrors 5 and 6 it is possible by observing a desired distance between the object and the camera 1 as measured along the optical path 9 to choose any desired small distance between the space accommodating said person and the camera 1, so that the floor space 8 enclosed by the confining walls of the booth 7 can be minimized. The reflecting mirror 6 that is closest to the person having his portrait taken is a swinging mirror so that the transmitted portion of the object can be varied and adjusted without having to shift either the camera 1 or the object to be photographed, i.e. without any adjustment of the stool level and possibly also without any lateral displacement. Concretely, the reflecting mirror 6 is mounted for swinging movement about a horizontal axis, the swinging axis being indicated at support 10. Swinging of the reflecting mirror 6 about the swinging axis support 10 is indicated in FIG. 4 by a double-headed arrow 31. The mounting of the swinging mirror 6 provides for rotation about a horizontal axis and about a vertical axis, and preferably is provided by a universal axis support 10.

The described swinging mirror arrangement including the camera is mounted within a box defining the photographic shooting apparatus 30 and having front and rear walls, bottom wall, top cover and two sidewalls, an opening 32 being formed in the front wall in which the reflecting mirror 6 closest to the object is positioned in such a way as to be able to project with one side thereof from the opening (see especially FIG. 3). Further, there are provided on the front wall beneath the reflecting mirror 6: an actuating button 13 operatively coupled to the swinging mirror mechanism, a remote release means 11, 14 operatively coupled to the camera release mechanism, a manually operated camera cocking means 15, and a counter 16 cooperating with the latter, these components being positioned economically relative to a person seated on the stool 4. Above the mirror assembly there are provided three flash bulbs 20, 21 and 22 in side-by-side relationship behind a transparent and surface-structured glass or plastic panel 19, the left-hand bulb (as viewed in FIGS. 3 and 4) functioning as "master flash" while the others function as sequence flashes, correspondingly cooperating photocells being used to trigger the latter flashes. It is preferred that the photocells are integral parts of the two flash bulbs 21 and 22. As will also be apparent from FIGS. 3 and 4, each flash bulb is oriented obliquely towards the glass or plastic panel 19 provided in front of the bulbs, said flash bulbs in the vertical plane including the following angles with a horizontal line that lies in said plane and extends in parallel to the glass or plastic front panel 19:

master flash 20: $\alpha_V = 25°$ to 35°, especially 30°;

central sequence flash 21: $\beta_V = 3°$ to 10°, especially about 5°;

outer sequence flash 22: $\gamma_V = 15°$ to 25°, especially about 20°.

The corresponding angles are shown in FIG. 4.

The angles of the flash bulbs 20, 21, 22 as included in the horizontal plane with a line lying in said plane and extending in parallel to the glass or plastic front panel 19, are as follows:

master flash 20: $\alpha_H 40°$ to 50°,to 50°, especially about 45°;

central sequence flash 21: $\beta_V = 15°$ to 25°, especially about 20°; and outer sequence flash 22: $\gamma_H = 15°$ to 25°, especially about 20°.

These angles are shown in FIG. 3. Due to the spatial arrangement and orientation of the flash bulbs 20, 21 and 22 and due to the mounting thereof behind a transparent and surface-structured glass or plastic panel the object is uniformly illuminated front and side within the space defined by the booth 7. At the same time it is ensured that there will be no glare. Due to the surface structure of the panel 19 the flashlight is particularly well diffused. To facilitate cleaning of the apparatus, it is preferred that the panel 19 is surface-structured on the inside, as will be apparent from FIG. 3.

Beneath the flash bulbs 20, 21 and 22 a fluorescent tube 33 is provided which during operation serves to illuminate the shooting space within the booth 7.

Figure 1:
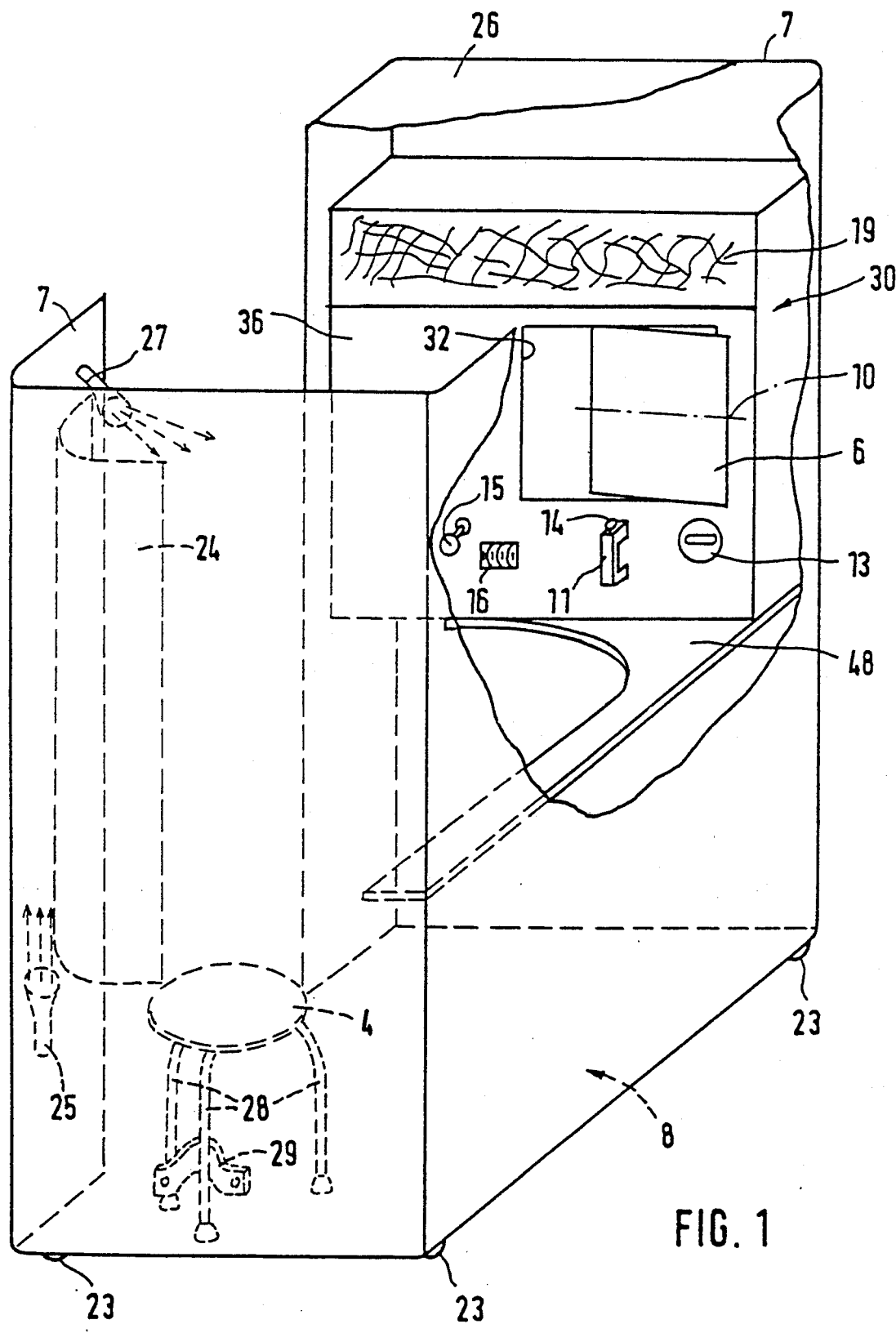
FIG. 1 is a perspective view of the shooting apparatus according to the invention disposed within a booth defining a shooting space, parts of the booth walls being broken away.
Figure 2:
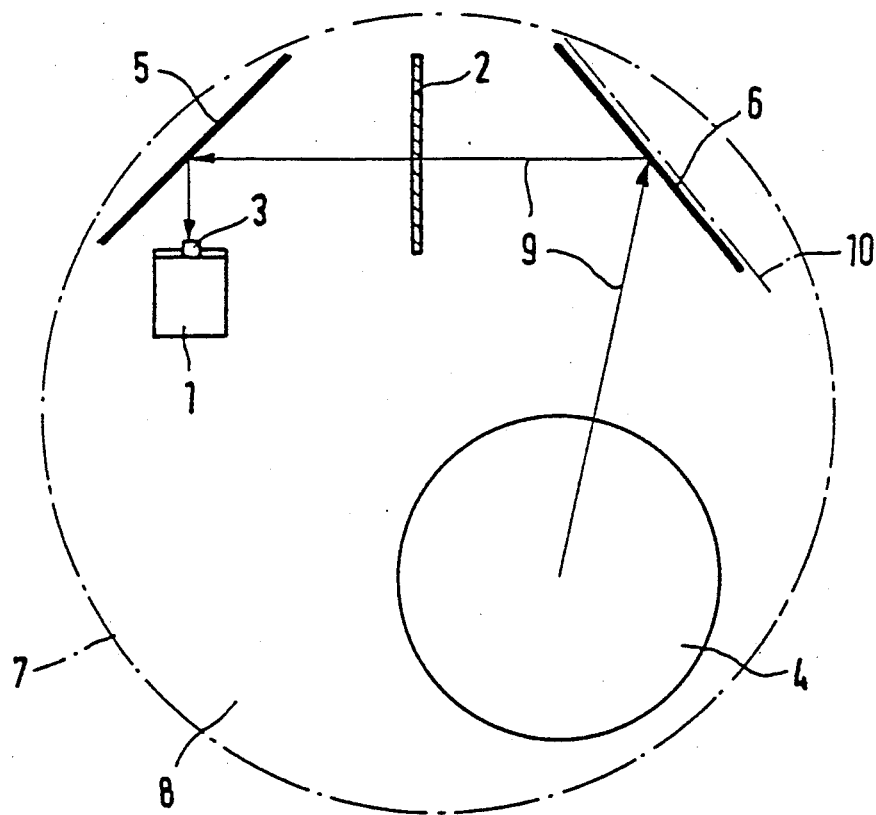
FIG. 2 is a basic top plan view of the photographic shooting apparatus of the invention.

The booth 7 comprises four sidewalls of which one sidewall has an access opening 34 that can be closed by means of a curtain (not illustrated) for taking a picture, and a top wall 26 (see FIG. 1). On the ground, the booth 7 defines a base surface 8; in the illustrated embodiment the booth is open at the bottom. Basically, it is also conceivable to define the base surface 8 by a separate floor. In the present case the booth 7 is also adapted to be moved on rollers 25.

For further improving the illumination of the object during an exposure operation, especially from the rear and the top, a further sequence flash 27 is provided on the side of the booth 7 opposite the shooting apparatus in diametrical relation to the reflecting mirror 6 closest to the object in the vicinity of the top corner of the booth, said sequence flash 27 being oriented obliquely upwardly and away from the mirror assembly or the reflecting mirror 6, respectively. Illumination of the object from the top and the rear occurs indirectly by reflection of the flashlight from the booth top 26 and the irradiated booth sidewalls. Triggering of the sequence flash 27 occurs in the same way as triggering of the sequence flashes 21, 22, i.e. by means of a photocell cooperating with the sequence flash 27, said photocell being energized by the master flash 20.

Behind the area where the user stays, or behind the stool 4, a curved and preferably exchangeable background 24 is mounted in the respective corner portion of the booth 7. By appropriate reflection this background enhances the illumination of the object from behind without any glare whatsoever. The background 24 may have any desired colour or comprise a town or landscape or similar motifs. Preferably, the background 24 is made from transparent material, especially a plastic panel or sheet, which after release of the camera 1 and hence of the master flash 20 is illuminated from the rear by a sequence flash 25 which is directed upwardly towards the booth top 26. The sequence flash 25 operates in the same way as the previously described sequence flashes.

As explained above, a stool 4 can be positioned on the inside of the booth wall opposite the shooting apparatus 30, especially by passing one leg 28 of the stool through a lug 29 or the like mounted on the respective booth wall. Thereby a predetermined spatial relationship between the stool 4 and the reflecting mirror 6 closest to the user is ensured The stool 4 is arranged so that the user will sit within the range of optimum depth of field. To prevent the user from still bending forward too far, i.e. from coming too close to the nearest reflecting mirror 6, a light barrier 35 may additionally be provided (FIG. 3) which comprises a light emitting element and a diametrically disposed light receiving element. When the beam between the light emitter and the light receiver is interrupted for instance by the user's head, the camera release may be blocked or a special indicator may be caused to flash to warn the user to move his head somewhat to the rear, i.e. away from the reflecting mirror 6.

Of course, the shooting apparatus 30 and especially the mirror assembly thereof is mounted within the booth 7 at a level which ensures that the reflecting mirror 6 closest to the user is approximately at eye level when the user is in a sitting position, i.e. sits on the stool 4 provided in the booth 7 or is at a similar constant level. Due to the reflecting mirror 6, which can be swung about the horizontal axis 10, the stool 4 need not be height-adjustable as is common with conventional photo-booths. Adjustment of the picture within a predetermined field of light is performed exclusively by corresponding swinging of the reflecting mirror 6 with the help of the actuating button 13.

Figure 5:
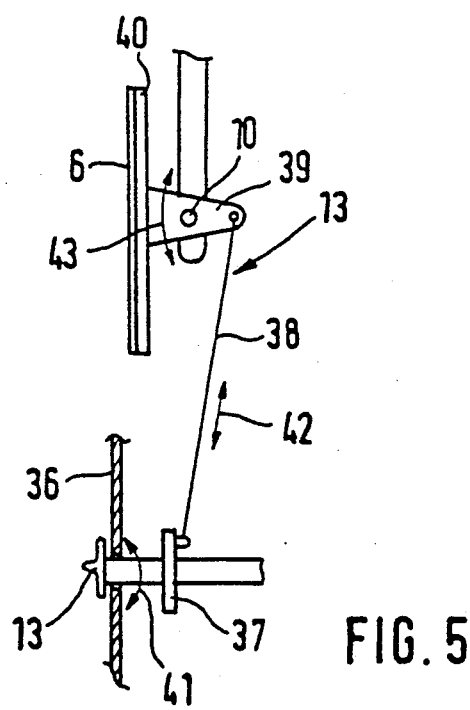
FIG. 5 is an enlarged schematic side view of the swinging mirror mechanism (crank mechanism).

As will be apparent from FIGS. 4 and 5, the swingably mounted reflecting mirror 6 is connected via a lever mechanism 13, i.e. a crank mechanism, with the rotatably mounted actuating button 13 disposed in the control area of the object, i.e. at the front of the shooting apparatus. Concretely, the actuating button 13 is connected to a panel 37 which is disposed behind the front wall 36 of the box defining the shooting apparatus 30. The outer circumference of this panel 37 has a connecting rod 38 pivotally mounted thereon. The diametrical end of the connecting rod 38 is connected to one end of a twin lever 39 which is mounted for pivoting movement about a horizontal axis. The other end of the twin lever 39 is connected to a support plate 40 for the reflecting mirror 6. Accordingly, the horizontal swinging axis 10 of the reflecting mirror 6 is defined by the horizontal pivot axis of the twin lever 39. The rotary motion of the actuating button 13 indicated by the doubleheaded arrow 41 in FIG. 5 is converted into a reciprocating motion of the connecting rod 38 as indicated by the doubleheaded arrow 42 and finally into a swinging motion of the reflecting mirror 6 about the horizontal axis 10 as indicated by the double-headed arrow 43.

The transmission ratio between actuating button 13 and swinging mirror 6 can be varied by varying the radial spacing of the coupling of the connecting rod 38 to the crank disk 37. Also, the connecting rod 38 may be designed for lengthwise adjustment. But these are per se known measures although they have not been known in conjunction with the described photographic shooting apparatus.

Further, it is of special importance that the camera 1, especially its film magazine 17 (see FIG. 4), has a thermostat-controlled heating means 18 cooperating therewith, said heating means being especially configured as an electric sheet resistor, whereby a preferred constant film temperature is guaranteed irrespective of varying lower ambient temperatures. The self-developing films provide optimum quality at a temperature of about 24° C.

If the apparatus is to be used in permanently warmer areas (at an ambient temperature of more than 24° C.) or if proper air conditioning of the film magazine 17 is desired, a thermostat-controlled cooling means may also be provided, especially in the form of so-called Peltier elements, whereby in a warmer environment a preferred lower and likewise constant film temperature is ensured. The heating and/or cooling means is preferably disposed in the laterally accessible film compartment 44 close to the film magazine 17. In FIG. 4, the cocking means for the camera 1 is indicated at 45. Finally, it will be apparent from FIG. 4 that the camera 1 is mounted within the apparatus such that the camera lens, which is preferably a four-element lens, is directed upwards to face a stationary reflecting mirror 5. Mounting of the reflecting mirror 5 is performed within a mounting shoe 46 having a receiving slot which corresponds to the bottom edge of the reflecting mirror 5. Within said receiving slot the mirror 5, which is inserted edgewise, is fixed by means of one or several locking screws.

The markings 12 of the field of view on the partially transmitting mirror 2 are defined by a coloured framing, preferably a rectangular framing, which is visible in the reflecting mirror 6 and inside which the user's head will have to be positioned.

As already explained initially, each reflecting mirror 5, 6 has a silvered surface.

Finally, a transparent protective cover may be disposed in front of the reflecting mirror 6 so as to prevent the accumulation of dust or traces caused by touching the reflecting mirror 6. The protective cover must be made of glass from which reflections have been eliminated so that the losses of light caused by the cover are reduced.

Finally, as will be apparent from FIG. 3, an edge protector 47 may be provided for the reflecting mirror 6, especially for the mirror edge which protrudes beyond the front of the box defining the shooting apparatus 30.

Moreover, beneath the shooting apparatus 30 there is provided a shelf 48 which extends from the shooting apparatus 30 beneath the area of the actuating button 13 and the remote release means 11, 14 sideways towards the rear and leaves a sufficiently large area for depositing articles thereon.

In the illustrated embodiment, the remote camera release means comprises a handle 11 with a release button 14 which is disposed so that release is effected by use of the thumb. As already explained above, operation can be considerably facilitated when the actuating button 13 and the remote camera release means 11, 14 are combined to form an assembly, especially when configured as a rotatably mounted handle with release button 14. There are no problems in this respect, especially since the release button 14 is connected to the camera release mechanism via a flexible cable, as known per se.

the inside of the booth is painted white, preferably offwhite to prevent reflections. This colour enhances proper illumination of the object during shooting.

All of the features disclosed in the application papers are claimed as being essential to the invention to the extent to which they are novel over the prior art either individually or in combination.

We claim:

1. Photographic portrait shooting apparatus, comprising a camera (1) having a camera lens for receiving the image of an object to be photographed and a partially transmitting mirror (2) disposed in the optical path (9) between the camera lens (3) and the object, comprising an even number of reflecting mirrors (5, 6), only one of said reflecting mirrors including a rotatable support for swinging of said mirror, said partially transmitting mirror (2) having field marking defining a limited field of view, and a remote release means (11, 14) for actuating the camera by the operator.

2. The apparatus in claim 1, wherein said partially transmitting mirror (2) is mounted in the optical path between the two reflecting mirrors (5, 6).

3. The apparatus of claim 1, wherein the partially transmitting mirror (2) is mounted between the object and the adjacent reflecting mirror (6).

4. The apparatus of claim 1, wherein said rotatable support is connected to said reflecting mirror (6) adjacent the object and oriented with a horizontal axis (10).

5. The apparatus of claim 4, wherein said rotatable support includes a vertical axis of rotation for rotation of said mirror about said vertical axis.

6. The apparatus of claim 1, wherein said rotatable support includes a lever mechanism and an actuating element adjacent the object.

7. The apparatus of claim 6, wherein coupling means connect said actuating element (13) with the camera remote release means (11, 14) to constitute a common assembly.

8. The apparatus of claim 1, wherein said camera (1) includes a camera cocking means (15 or 45), and an encoded control having an encoded input for enabling said cocking means.

9. The apparatus of claim 1, wherein each said reflecting mirror (5, 6) includes a silvered reflecting surface.

10. The shooting apparatus of claim 1, wherein the camera (1) includes a film magazine (17), and thermostat controlled heating means (18) in said film magazine establishing a constant film temperature within said magazine.

11. The apparatus of claim 1, wherein the camera (1) includes a film magazine (17), and thermostat-controlled cooling means in said film magazine establishing a constant film temperature within said magazine.

12. The apparatus of claim 1, wherein said reflecting mirrors (5, 6) and partially transmitting mirror (2) are aligned, a transparent and surface-structured panel (19) mounted in from of said aligned mirror, a plurality of flash bulbs (21, 22, 23) mounted in side-by-side relationship, a first (20) of said flash bulbs being a "master flash" responsive to actuating of the release means and others (21, 22) of said bulbs being "sequence flashes" for operation in responses to said first flash bulb, light sensor located to sense the flash of at least said first flash bulb to trigger said other flash bulbs.

13. The shooting apparatus of claim 12, wherein each flash bulbs (20, 21, 22) is oriented at an inclination to said glass or plastic panel (19).

14. The shooting apparatus of claim 13, wherein said flash bulbs (20, 21, 22) includes at least other bulbs located in a vertical plane and said flash bulbs include the following angles with ah horizontal line which lies in said plane and extends parallel to the front panel (19):
said first flash bulb (20): $\gamma_V = 25°$ to $35°$,
a second flash bulb (21): $\beta_V = 3°$ to $10°$,
a third flash bulb (22): $\gamma_V = 15°$ to $25°$,
whereas the angles of the flash bulbs (20, 21, 22) as included in the horizontal plane with a line lying in said plane and extending in parallel to the panel (19) are as follows:
said first flash bulbs (20): $\gamma_H = 40°$ to $50°$,
said second flash bulb (21): $\beta_H = 15°$ to $25°$,
and
said third flash bulb (22): $\gamma_H = 15°$ to $25°$.

15. The shooting apparatus of claim 1 in combination with a booth, said apparatus mounted inside said booth (7), a seat in said booth for sealing of suer, said reflecting mirror (6) closest to the user being mounted approximately at the eye level of user seated in said seat.

16. The combination of claim 15, including rolling supports (23) or the like, said booth for moving said booth.

17. The combination of claim 15, having a curved background member (24) located to the rear of the seat.

18. The combination of claim 17, wherein said booth includes a ceiling background, said member (24) is made of transparent material which upon release of the camera (1) is illuminated from the rear by a sequence flash bulb (25) directed upwards to the ceiling (26) of the booth (7).

19. The combination of claim 17, including a sequence flash bulb (27) located above said background member and establishing a flash directed obliquely upwardly and away from the mirror assembly.

20. The combination of claim 15, wherein said seat (4) is fixed to a sidewall of the booth (7) spaced from the shooting apparatus (30), said seat having at least one leg passing through said locating member (29) mounted on said booth wall and establishing a predetermined spatial relationship of the seat (4) and the reflecting mirror (6) closest to the person having his portrait taken is ensured.

* * * * *

UNITED STATES PATENT AND TRADEMARK OFFICE
CERTIFICATE OF CORRECTION

PATENT NO. : 5,023,638
DATED : June 11, 1991
INVENTOR(S) : FRANZ SIEGESLEUTHNER ET AL It is certified that error appears in the above-identified patent and that said Letters Patent is hereby corrected as shown below:

Claim 1, Col. 8, Line 39, delete "marking" and substitute therefor -- markings --; Claim 6, Col. 8, Line 55, after "lever mechanism" insert --(crank mechanism 13)--; Claim 12, Col. 9, Line 11, delete "from" and substitute therefor -- front --; Claim 12, Col. 9, Line 16, delete "sensor" and substitute therefor -- sensors --; Claim 14, Col. 9, Line 25, delete "ah" and substitute therefor --a--; Claim 14, Col. 9, Line 27, delete "γ" and substitute therefor -- α --; Claim 14, Col. 10, Line 1, delete "bulbs" and substitute therefor -- bulb --; Claim 14, Col. 10, Line 1, delete "γ" and substitute therefor -- α --; Claim 15, Col. 10, Line 7, delete "sealing of suer" and substitute therefor -- seating of user --; Claim 17, Col. 10, Line 14, after "rear" insert -- of the rear --.

Signed and Sealed this

Twenty-ninth Day of June, 1993

Attest:

MICHAEL K. KIRK

*Attesting Officer*          *Acting Commissioner of Patents and Trademarks*